United States Patent [19]
Wetherill et al.

[11] Patent Number: 5,660,475
[45] Date of Patent: Aug. 26, 1997

[54] HEATER FACSIMILE TEMPERATURE DETECTOR, AND METHOD OF ASSEMBLING SAME

[75] Inventors: Todd M. Wetherill, Montour Falls; Kerwin C. Playfoot, Horseheads, both of N.Y.

[73] Assignee: Imaging & Sensing Technology Corporation, Horseheads, N.Y.

[21] Appl. No.: 423,416

[22] Filed: Apr. 18, 1995

[51] Int. Cl.$^6$ ........................................... G01K 1/00
[52] U.S. Cl. ................................. 374/208; 374/179
[58] Field of Search ........................... 374/179, 208, 374/163, 174; 29/592.1

[56] References Cited

U.S. PATENT DOCUMENTS

| | | | |
|---|---|---|---|
| 3,015,234 | 1/1962 | Springfield | 374/208 |
| 3,923,552 | 12/1975 | Parris | 374/179 |
| 4,477,687 | 10/1984 | Finney | 374/179 |
| 4,925,638 | 5/1990 | Chakravarti | 374/179 |
| 4,971,452 | 11/1990 | Finney | 374/208 |
| 5,110,218 | 5/1992 | Aizawa et al. | 374/179 |
| 5,141,335 | 8/1992 | Wannamaker | 374/179 |

FOREIGN PATENT DOCUMENTS 2128743  5/1984  United Kingdom ................... 374/179

*Primary Examiner*—Daniel G. DePumpo
*Attorney, Agent, or Firm*—Phillips, Lytle, Hitchcock, Blaine & Huber

[57] ABSTRACT

An improved heater facsimile temperature detector (47) has an increased dynamic responsiveness in measuring temperature changes. The improved HFTD (47) reduces the amount of mass surrounding the thermocouple tip, thus, reducing the time lag caused by the intervening heating or cooling of this material before the temperature change can affect the thermocouple. The thermocouple (69) is welded to a body (59) extending beyond a machined flat (54) on the outer surface of an intermediate portion (49) of the HFTD. The body does not extend beyond the outer surface (51) of the intermediate portion.

22 Claims, 4 Drawing Sheets

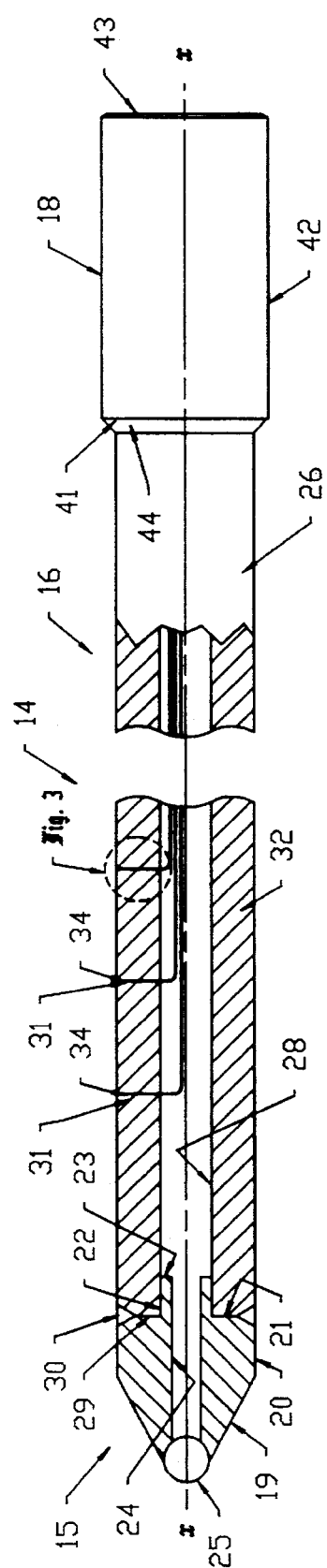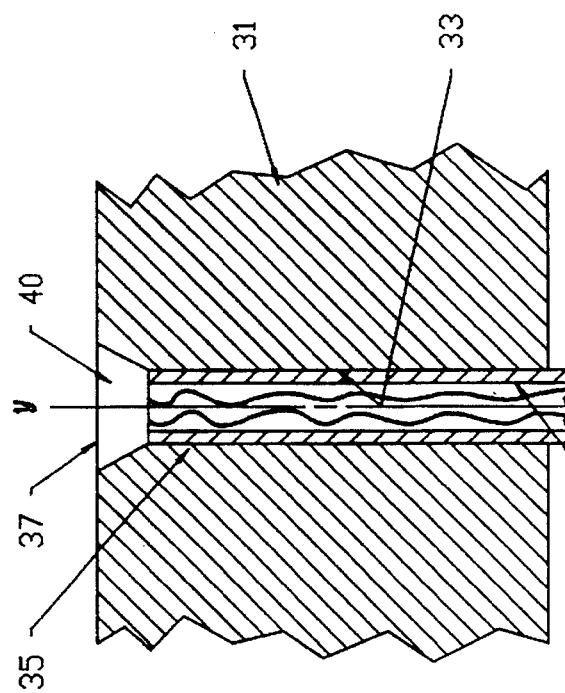

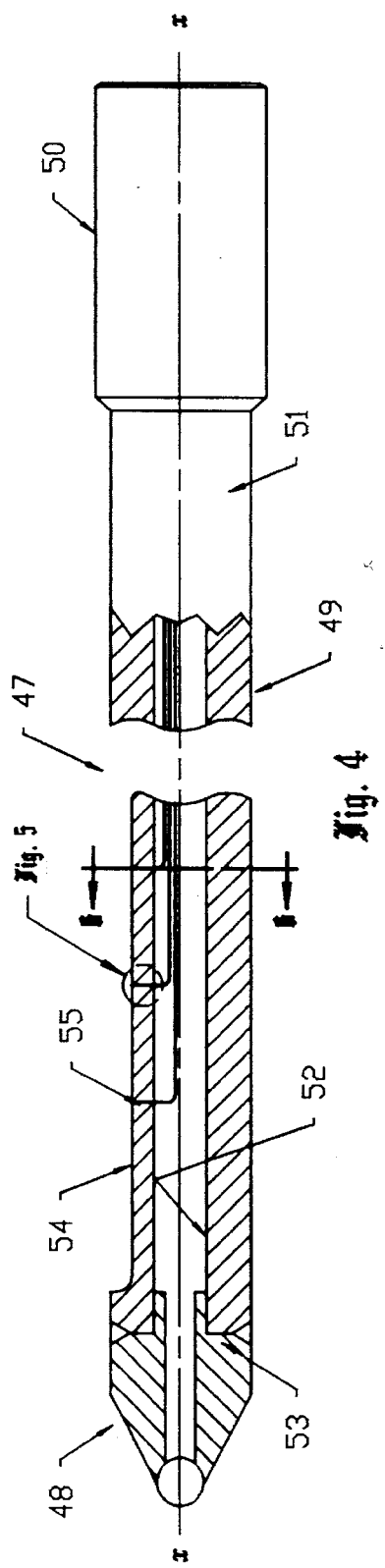
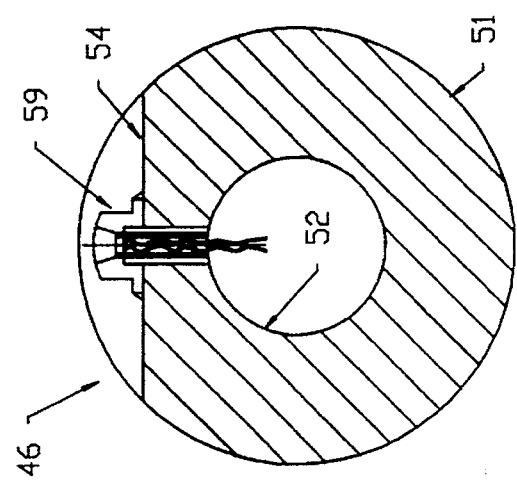
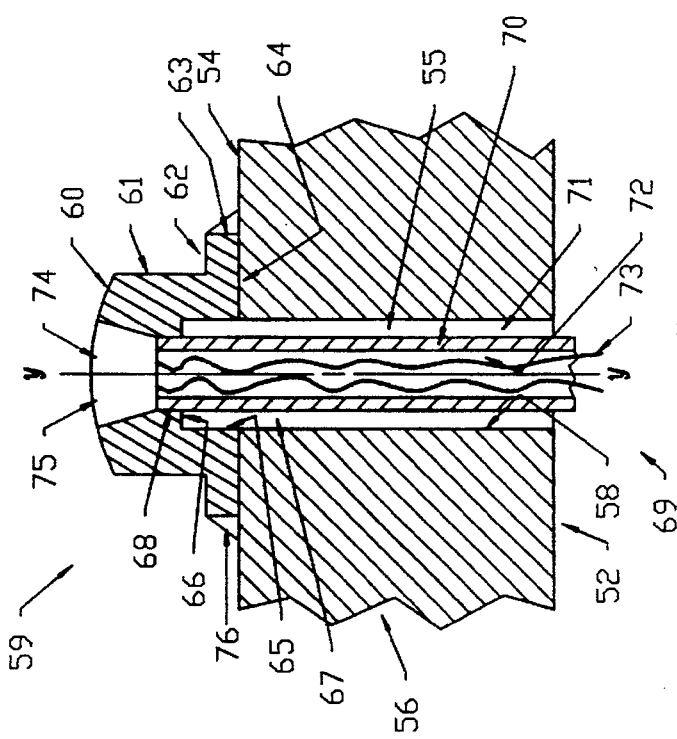

HEATER FACSIMILE TEMPERATURE DETECTOR, AND METHOD OF ASSEMBLING SAME

TECHNICAL FIELD

The present invention relates generally to the field of temperature detectors, and, more particularly, to an improved temperature detector that is adapted to simulate the outward appearance of a probe-type heater that is adapted to be inserted into a pressure vessel to measure the temperature gradient of a fluid therein.

BACKGROUND ART

Nuclear reactors sometimes include pressure vessels that are partially or wholly filled with water. One or more probe-type heaters are adapted to be inserted into the vessel and selectively operated to raise the temperature of the water therein. However, the temperature of the vessel water may vary widely. For example, if cold water is admitted to fill the vessel, the temperature of the vessel water may quickly drop. Indeed, the temperature of such vessel water may vary from about 38° C. (100° F.) to about 343° C. (650 ° F.). At the same time, the pressure within the vessel may vary from about 0 bar (0 psig) to about 174 bar (2200 psig).

Often, the pressure vessel has a hemi-spherical head at its lower end. A plurality of depending tubular sleeves are welded to the vessel wall and surround holes provided therethrough. These sleeves provide a means or mechanism by which the probe-type heaters may be inserted into the vessel. There may be on the order of 40–100 of these heater sleeves on the vessel.

It is also desirable to know the temperature gradient of the vessel water. To this end, it is known to replace one of the heaters with a heater facsimile temperature detector ("HFTD"). These devices are so-named because the detector is also a probe-type device that outwardly appears to have substantially the same shape as the insertable probe-type heater element. Since they simulate the outward appearance of the heater elements, they are denominated "heater facsimiles". However, internally they have a plurality of axially-spaced temperature detectors, such as thermocouples, operatively arranged to indicate temperature of the vessel water at various points along the length of the probe.

If the dynamic response of a prior art HFTD could be increased, the result would be greater accuracy and precision in its measurements. It is important that the operator know the operational condition of the vessel at all times. Hence, it would be generally desirable to provide an improved HFTD that affords the capability of enhanced dynamic response, particularly to rapid and abrupt changes in the temperature of the vessel water.

DISCLOSURE OF THE INVENTION

The present invention, in one aspect, provides an improved heather facsimile temperature detector. In another aspect, it provides an improved method of assembling such a temperature detector.

With parenthetical reference to the corresponding parts, portions or surfaces of the disclosed embodiment, merely for purposes of illustration and not by way of limitation, the improved temperature detector (e.g., 47) is an elongated (straight or curved) hollow tube (not necessarily cylindrical) broadly comprising an intermediate portion (e.g., 49) having a side wall (e.g., 56) defined between an inner surface (e.g., 52) and an outer surface (e.g., 51), and having an opening (e.g., 55) communicating the surfaces; a body (e.g., 59) mounted on the tube outer surface (e.g., 54) to surround the hole and having an upper portion spaced from the tube outer surface; a temperature sensing device (e.g., 69) having a sensing portion (e.g., 74) mounted on the body upper portion and having at least one conductor (e.g., 73) passed through the hole; whereby the body will have an exposed surface area of increased size such that the dynamic response of the device to changes in temperature will be increased.

The improved method of assembling a temperature detector broadly comprises the steps of: providing an elongated hollow tube having a side wall defined between an inner surface and an outer surface, and having a hole communicating the surfaces; providing a body; mounting the sensing portion of a temperature sensing device on the body; mounting the body on the tube such that one portion of the body engages the tube outer surface and surrounds the hole, the device sensing portion is spaced from the tube outer surface, and at least one electrical conductor passes through the hole; and securing the body in fluid-tight relation to the tube; thereby to expose a large surface area of the body such that the dynamic response of said device to changes in temperature will be increased.

Accordingly, the general object is to provide an improved temperature detector.

Another object is to provide an improved method of assembling a temperature detector.

Another object is to provide an improved temperature detector that simulates the outward appearance of a probe-type heater.

Still another object is to provide a probe-type heater facsimile temperature detector that is adapted to replace a similarly-configured heater element and that may be used to indicate the temperature gradient of a fluid.

These and other objects and advantages will become apparent from the foregoing and ongoing written specification, the drawings, and the appended claims.

BRIEF DESCRIPTION OF THE DRAWINGS

FIG. 2 is a fragmentary enlarged view, partly in longitudinal cross-section and partly in elevation, of the prior art HFTD shown in FIG. 1, this view depicting the HFTD as being rotated 90° in a counterclockwise direction and showing the thermocouples arranged at various axially-spaced locations therealong.

FIG. 3 is a further-enlarged fragmentary vertical sectional view of the prior art thermocouple, this view being taken generally within the indicated area in FIG. 2, showing a thermocouple in relation to an associated hole and the cylindrical side wall.

FIG. 4 is a fragmentary view, partly in longitudinal cross-section and partly in elevation, showing an improved HFTD.

FIG. 5 is a further-enlarged fragmentary vertical sectional view of the improved HFTD, this view being taken generally within the indicated area in FIG. 4, showing the thermocouple in relation to the hole, wall and body.

FIG. 6 is a fragmentary transverse vertical sectional view of an improved HFTD, this view being taken generally on line 6—6 in FIG. 4.

DESCRIPTION OF THE PREFERRED EMBODIMENTS

Figure 1:
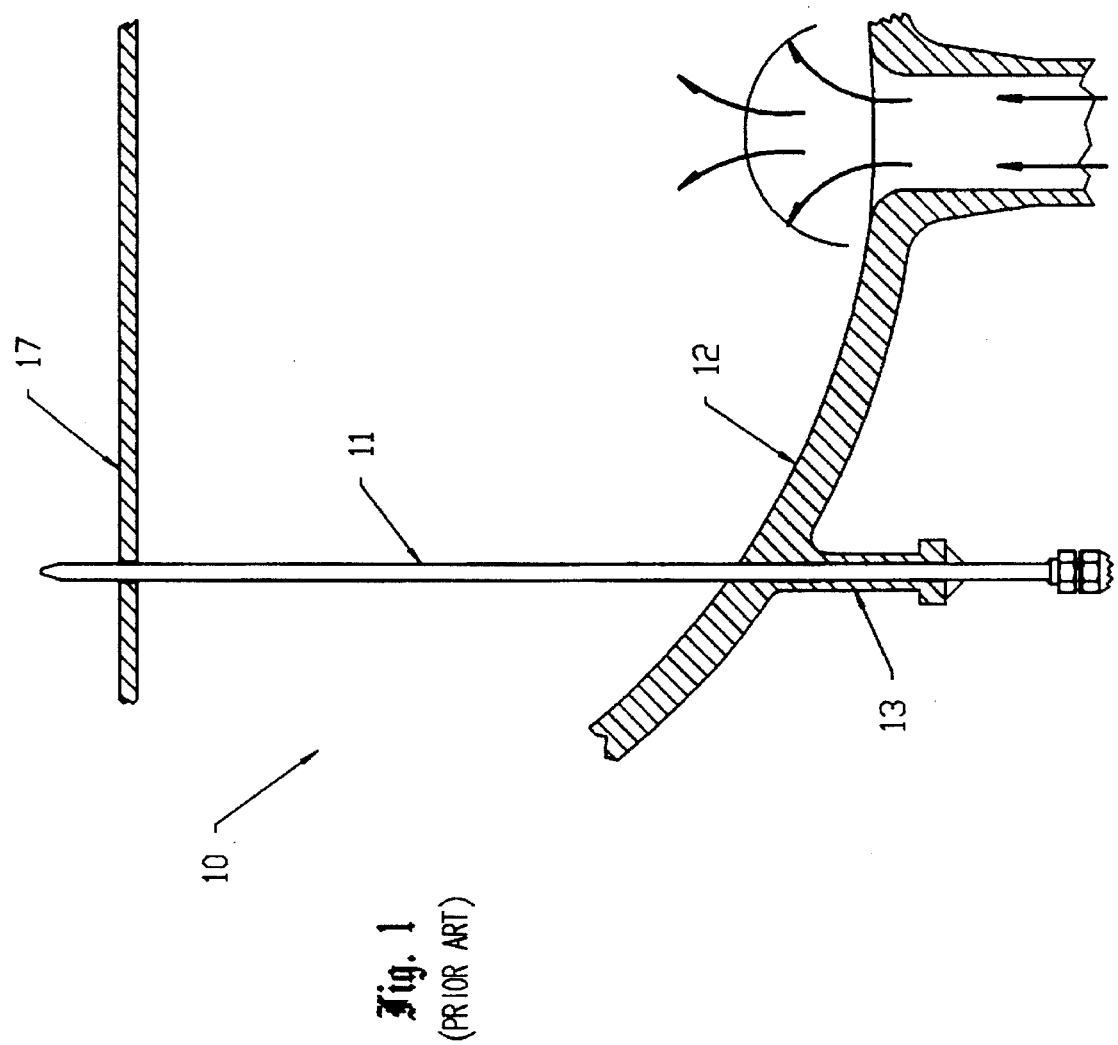
FIG. 1 is a fragmentary vertical sectional view of a pressure vessel, showing a prior art probe-type heater facsimile temperature detector as penetrating the vessel wall.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Prior Art HFTD (FIGS. 1–3)

Referring now to FIG. 1, a pressure vessel 10 of a nuclear power plant (not shown) is depicted as having at least one probe-type heater, generally indicated at 11, penetrating the vessel wall 12 through an integrally-formed depending tubular sleeve 13. The upper marginal end portion of the heater is shown as penetrating an aligned hole in a plate-like overhead support 17. Heater 11 is adapted to selectively heat the fluid in vessel 10. An HFTD, described infra, has an outward shape and appearance size substantially identical to that of the heater, and replaces a heater.

A prior art HFTD, generally indicated at 14, is shown in FIGS. 2 and 3. This device, depicted as a hollow tube elongated along horizontal axis x-x, includes a leftward bullet-like tip 15, a cylindrical intermediate portion 16, and a rightward cup-shaped base 18.

Tip 15 is shown as being an axially-elongated solid member sequentially bounded by an outwardly- and leftwardly-facing frusto-conical surface 19, an outwardly-facing horizontal cylindrical surface 20, rightwardly-facing annular vertical surface 21, and an outwardly-facing horizontal cylindrical surface 22 continuing rightwardly therefrom to join an annular vertical right face 23. The tip is provided with an axial through-bore bounded by an inwardly-facing cylindrical surface 24. During assembly of HFTD 14, the left marginal end portion of the tip bore is sealed by a weld 25, thus closing the bore in a fluid-tight manner.

Intermediate portion 16 is an axially-elongated hollow cylinder having an out-wardly-facing horizontal cylindrical surface 26, an annular vertical right end face (not shown), an inwardly-facing horizontal cylindrical surface 28 and an annular vertical left end face 29. The radius of tip cylindrical surface 22 is slightly less than the radius of cylinder inner surface 28, allowing the insertion of the right marginal end portion of tip 15 into the left margin of intermediate portion 16 until surfaces 21 and 29 abut. The radius of cylindrical surface 26 is substantially equal to the radius of tip surface 20. Tip 15 and intermediate portion 16 are joined together by a peripheral weldment 30. The outer surface of this weldment is substantially flush with cylindrical surfaces 20 and 26 so that the HFTD simulates the shape of the heater it replaces, and it will slide through the vessel sleeve.

A plurality of radial openings, severally indicated at 31, extend through cylinder side wall 32 between inner surface 28 and outer surface 26 at various axially-spaced locations therealong. Each radial opening is shown as being elongated along a vertical axis, severally indicated at y-y (FIG. 3). Axis y-y need not necessarily be perpendicular to axis x-x. Non-perpendicular orientation of the axes is known to simplify passing a thermocouple assembly, described infra, therethrough. FIG. 3 shows a radial opening 31 as being bounded by an inwardly-facing vertical cylindrical surface 33.

In the prior art embodiment, a thermocouple assembly, generally indicated at 34, is passed through each opening 31 from inner surface 28 to outer surface 26. Each thermocouple assembly includes a thin-walled cylindrical sheath 35 bounded by outer and inner surfaces 36, 38, respectively, surrounding thermocouple leads, severally indicated at 39. Hole axis y-y serves as the axis for that portion of thermocouple assembly 34 in opening 31. The radius of sheath outer surface 36 is slightly less than the radius of hole surface 33, thus insuring a tight fit therebetween. The tip end portion 40 of the thermocouple assembly is welded, as indicated at 37, as close as possible to cylinder outer surface 26, and is normally positioned from about 0.010–0.040 inches (2.54–10.16 mm) from that outer surface.

Base 18 is cup shaped and is defined by member 41, an axially elongated hollow cylinder having an annular vertical left end surface 42 and vertical bottom surface 43. The right marginal end portion of intermediate portion 16 is inserted within base 18, and the two members are permanently joined in a fluid-tight manner by peripheral weldment 44. A series of horizontal holes (not shown) are present in bottom 43, each hole allowing passage of a single thermocouple assembly 34 therethrough.

After assembly, HFTD 14 is slidably passed upwardly through sleeve 13 of pressure vessel 10, as shown in FIG. 1. The upper marginal end portion of the HFTD is passed through a vertical opening in an intermediate horizontal support plate 17.

In practice, a change in the temperature of a fluid surrounding the HFTD near the thermocouple assemblies 34 changes the temperature of the cylindrical side wall. Unfortunately, this causes an undesirable lag between a change in the fluid temperature and its measurement by the thermocouple.

Improved HFTD (FIGS. 4–6)

The present invention alters the shape of the prior art intermediate body, and employs a unique body assembly to position the sensing tips of the thermocouple assemblies in spaced relation to the outer surface of the HFTD to increase the dynamic responsiveness of the thermocouples to temperature changes of the surrounding fluid.

Referring now to FIG. 4–6, an improved HFTD, generally indicated at 47, is an olongated hollow tube including a leftward bullet-like tip 48, a cylindrical intermediate portion 49, and a rightward base 50. Tip 48 and base 50 are identical to tip 15 and base 18, respectively, of the prior art embodiment. Hence, these elements will not be further described. However, intermediate portion 49 is significantly different from intermediate portion 16.

Intermediate portion 49 is an axially-elongated hollow cylinder having an outwardly-facing horizontal cylindrical surface 51, an annular vertical right end face (not shown), an inwardly-facing horizontal cylindrical surface 52, and an annular vertical left end face 53. A longitudinal flat is machined into intermediate portion 49 to provide an upwardly-facing horizontal planar surface 54.

A plurality of radial holes, severally indicated at 55, extend through side wall 56 between inner surface 52 and flat surface 54 at various axially-spaced locations therealong. Each hole 55 is defined by an inwardly-facing cylindrical surface 58 generated about vertical axis y-y. Flat surface 54 begins to the right of the left end face of intermediate portion and extends rightwardly beyond the rightwardmost opening 55, but stops short of the right end face of intermediate portion 49.

As best shown in FIG. 5, a body, generally indicated at 59, is mounted on flat surface 54 flat over each opening 55. Body 59 is a vertically-elongated specially-configured member sequentially bounded by an upwardly- and outwardly-facing annular convex surface 60, an outwardly-facing vertical cylindrical surface 61, an upwardly-facing annular horizontal surface 62, an outwardly-facing vertical cylindrical surface 63, a downwardly-facing annular horizontal surface 64 adapted to rest on flat surface 54, an inwardly-facing vertical cylindrical surface 65, a downwardly-facing annular horizontal surface 66, and an inwardly-facing vertical cylindrical surface 68 continuing upwardly therefrom to join the inner margin of convex surface 60. Surfaces 65, 66 and 68 define a stepped bore 67 through body 59.

Thermocouple assembly 69 is identical to thermocouple assembly 34 of the prior art; that is, thermocouple assembly 69 includes a thin-walled cylindrical sheath 70 bounded by outer and inner surfaces 71, 72, respectively, surrounding leads severally indicated at 73, and tip end portion 74. Thermocouple assembly 69 is joined to body 59 by weldment 75.

Body inner surface 68 is slightly larger than sheath outer surface 71, thus forming a tight engagement when thermocouple assembly 69 is passed therethrough. Body inner surface 65 is substantially larger than sheath outer surface 70, creating an annular gap between the two surfaces when thermocouple assembly 69 is passed through bore 67. Inner surface 65 is substantially of the same radius as hole 55. Body 59 and intermediate portion 49 aide joined by weldment 76.

When thermocouple assembly 69 is joined to body 59, and body 59 is mounted on flat surface 54, tip 74 is positioned beyond flat surface 54 and is surrounded only by body 59 but not by side wall 56, as in the prior art. Thus, the amount of mass surrounding tip 74 is reduced, and the dynamic responsiveness of thermocouple assembly 69 in measuring changes in temperature of the surrounding fluid is increased substantially.

Figure 7:
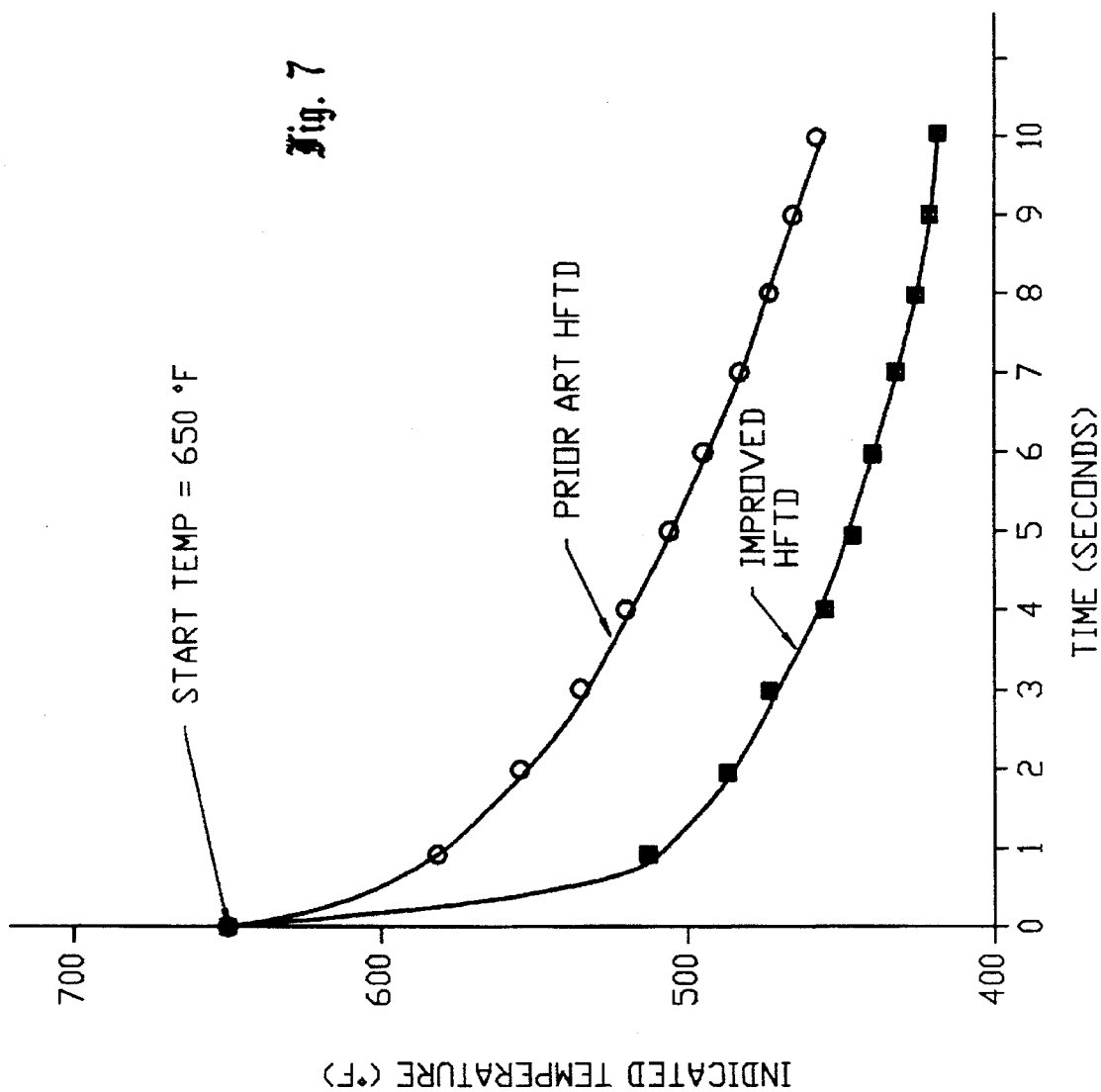
FIG. 7 is a graph of temperature (ordinate) vs. time (abscissa), and comparatively illustrates the dynamic response characteristics of the prior art HFTD (as shown in FIGS. 2–3) and the improved HFTD (as shown in FIGS. 4–5) in response to an assumed step decrease of vessel water temperature of about 121° C. (250° F.), as when cold water is added to refill the vessel.

FIG. 7 is a plot comparing the dynamic responsiveness of the prior art HFTD with the improved HFTD. Prior to time t=0, the two HFTD's are exposed to a fluid temperature of 650° F. Both are in steady state, and accurately measure the true temperature of the fluid. At time t=0, the temperature of the fluid undergoes a step change drop from 650° F. to 400° F. Both HFTD's measure the change in temperature. As time passes, the measurements by the improved HFTD move more quickly toward the true surrounding fluid temperature than measurements by the prior art HFTD. FIG. 7 clearly shows that the present invention has a better dynamic response when measuring a temperature change in a surrounding fluid.

Improved Method

Use of its improved body assembly and machined flat also provides an unique method for assembling a HFTD. Referring to FIGS. 2 and 3, the production method for prior art HFTD's is fairly straight-forward. The three main members (i.e., tip 15, intermediate portion 16 and base 18) are individually formed and are then joined together by weldments 30 and 44. Each individual thermocouple assembly 34 is then passed through the right marginal end portion of base 18 and into an opening 31 and carefully pushed outwardly toward outer surface 26. The manual placement of each thermocouple assembly 34 is then fixed by weldment 37. Next, any portion of weldments 30 or 37 that extends beyond outer surface 26, is removed to insure the dimensions of the HFTD do not exceed the dimensions of the sleeve the HFTD will pass through. After the junction ends of thermocouple assemblies 34 are welded in place, the tail portions thereof are fed through respective openings in bottom 43.

This process, particularly the feeding of a thermocouple assembly 34 through an opening 31, is difficult and time-consuming. It is known to make this process somewhat easier by drilling holes 31 at a non-perpendicular angle with respect to axis x-x. Each thermocouple assembly 34 is set into position by a weldment where it is passed through base 18. The weldment forms a fluid-tight seal between the thermocouple assembly 34 and base 18. After all thermocouple assemblies have been placed, a vacuum mechanism (not shown) is attached to the left marginal end portion of tip 15 (not shown). The mechanism evacuates the gases within the sheath. Helium gas is then introduced to fill the sheath, after which, tip 15 is closed by weldment 25.

Assembly of the present invention differs in the method of attaching thermocouple assembly 69 to intermediate portion 49 and the passing of a portion of the thermocouple assembly through opening 31. Otherwise, the method of the prior art is followed.

The first difference between the two methods is to machine the flat surface 54 in intermediate portion 49. Openings 55 are then drilled leading from flat surface 54 to inner surface 52. Each thermocouple assembly 69 is joined by weldment 75 to body 59. Thermocouple assembly 69 is fed through a hole 55, and intermediate portion 59 is welded to body 49.

A substantial time-saving versus the prior art assembly method occurs when passing thermocouple assembly through side wall. In the prior art, the thermocouple assembly was passed outwardly from inner surface to outer surface. It was impractical to pass the entire length of thermocouple assembly through the tight-fitting opening. In the instant invention, the thermocouple assembly is passed through side wall in a reverse fashion, that is, by passing thermocouple assembly inwardly from the flat surface through the side wall to the inner surface. This passage is facilitated by the annular gap between the thermocouple sheath and hole surface 55. Therefore, the time needed to feed the thermocouple through the hole is reduced.

Moreover, the instant invention allows for more accurate calibration of the thermocouple. In the prior art arrangement, the thermocouple assembly is calibrated before it is welded to the body. However, this welding may affect the calibration. In the instant invention, on the other hand, the thermocouple assembly is calibrated after it has been welded to body 59. After the calibration is complete, body-thermocouple sub-assembly is then welded to flat surface 54. This subsequent weld does not affect the calibration of thermocouple assembly 69.

Finally, repair or replacement of a malfunctioning thermocouple assembly in the instant invention is much easier than with prior art devices. When a thermocouple malfunctioned in a prior art device, it was nearly impossible to loosen thermocouple assembly from the body for testing or replacement. It is possible an entirely new HFTD could be required. In the instant invention, body 59 can easily be broken away from flat surface 54 for testing, repair or replacement.

Modifications

The present invention contemplates that many changes and modifications may be made. For example, other types of "flat" surfaces can be provided on the intermediate portion. The shape and configuration of various components may be changed. Fastenings other than welds may also be used. Other types of temperature sensing devices, such as RTD's or the like, may be substituted for a conventional-thermocouple.

Therefore, while a preferred form of the improved HFTD has been shown and described, and several modifications and changes thereof discussed, persons skilled in the art would readily appreciate the various additional changes and modifications that may be made without the departing from the spirit of the invention, as defined and differentiated by the following claims.

What is claimed is:

1. A temperature detector, comprising:
   an elongated hollow tube having a side wall defined between an inner surface and an outer surface, and having a hole communicating said surfaces;
   a body having one portion mounted on said tube outer surface to surround said hole and having another portion spaced from said tube outer surface;
   a temperature sensing device having a sensing portion mounted on said body other portion and having at least one conductor passed through said hole; and
   said body and said temperature sensing device sealing said hole.

2. A temperature detector as set forth in claim 1 wherein a portion of said tube outer surface is planar.

3. A temperature detector as set forth in claim 1 wherein said tube inner surface is cylindrical.

4. A temperature detector as set forth in claim 1 wherein said tube inner surface faces into a sealed chamber.

5. A temperature detector as set forth in claim 4 wherein said chamber is filled with an inert gas.

6. A temperature detector as set forth in claim 5 wherein said inert gas is substantially at atmospheric pressure.

7. A temperature detector as set forth in claim 5 wherein said inert gas is helium.

8. A temperature detector as set forth in claim 1 wherein said tube is cylindrical, and wherein a flat is machined into said tube from its outer cylindrical surface to provide said outer surface.

9. A temperature detector as set forth in claim 1 wherein said temperature sensing device is a thermocouple.

10. A temperature detector as set forth in claim 1 wherein said body one portion is welded to said tube outer surface, and said temperature sensing device is welded to said body.

11. A temperature detector as set forth in claim 1 wherein said hole has an axis normal to said tube outer surface.

12. The method of assembling a temperature detector, comprising the steps of:
    providing an elongated hollow tube having a side wall defined between an inner surface and an outer surface, and having a hole communicating said surfaces;
    providing a body;
    mounting the sensing portion of a temperature sensing device on said body;
    mounting said body on said tube such that one portion of said body engages said tube outer surface and surrounds said hole, said device sensing portion is spaced from said tube outer surface, and at least one electrical conductor passes through said hole; and
    securing said body in fluid-tight relation to said tube such that said body and said temperature sensing device seal said hole.

13. The method as set forth in claim 12 and wherein the step of securing said body to said tube includes the step of welding said body to said tube.

14. The method as set forth in claim 12 wherein said temperature sensing portion is mounted on said body such that said device and said body form a subassembly.

15. A temperature detector, comprising:
    an elongated hollow tube having a side wall defined between an inner surface and an outer surface, and having a hole communicating said surfaces;
    a cup-shaped body having a mouth portion and a bottom portion, said mouth portion surrounded by a flange, said flange mounted on said tube outer surface to surround said hole and said bottom portion spaced from said tube outer surface; and
    a temperature sensing device having a sensing portion mounted to said bottom portion of said cup-shaped body and having at least one conductor passed through said hole.

16. A temperature detector as set forth in claim 15 wherein a portion of said tube outer surface is planar.

17. A temperature detector as set forth in claim 15 wherein said tube inner surface is cylindrical.

18. A temperature detector as set forth in claim 15 wherein said tube inner surface faces into a sealed chamber.

19. A temperature detector as set forth in claims 18 wherein said chamber is filled with an inert gas.

20. A temperature detector as set forth in claim 15 wherein said temperature sensing device is a thermocouple.

21. A temperature detector as set forth in claim 15 wherein said flange of said body is welded to said tube outer surface and said temperature sensing device is welded to said body.

22. A temperature detector as set forth in claim 15 wherein said hole has an axis normal to said tube outer surface.

* * * * *